United States Patent
Marsh et al.

[11] 4,054,388
[45] Oct. 18, 1977

[54] OPTICAL CONTROL MEANS

[75] Inventors: David Malcolm Marsh; Richard Daniel Slater, both of Cambridge, England

[73] Assignee: T.I. (Group Services) Limited, Birmingham, England

[21] Appl. No.: 607,022

[22] Filed: Aug. 22, 1975

[30] Foreign Application Priority Data

Aug. 22, 1974 United Kingdom ............... 36859/74

[51] Int. Cl.² .................................................. G01B 11/14
[52] U.S. Cl. .................................................. 356/172
[58] Field of Search ............... 356/172; 250/202, 561

[56] References Cited

U.S. PATENT DOCUMENTS

| | | | |
|---|---|---|---|
| 3,249,758 | 5/1966 | DeLuca et al. | 250/561 |
| 3,718,823 | 2/1973 | Niikura et al. | 250/561 |
| 3,775,011 | 11/1973 | Marsh | 356/172 |
| 3,881,568 | 5/1975 | Ando et al. | 250/202 |
| 3,951,550 | 4/1976 | Slick | 356/172 |

*Primary Examiner*—John K. Corbin
*Assistant Examiner*—Richard A. Rosenberger
*Attorney, Agent, or Firm*—Scrivener, Parker, Scrivener and Clarke

[57] ABSTRACT

Improved optical means for automatically controlling or monitoring the position of a relatively moving member such as a tool tip in a numerically controlled machine tool has an image of a region of a datum line projected on to a slit in an optical system. Light passing through the slit falls on to a photoelectric detector device which comprises an array of discrete elements. The elements are electronically scanned sequentially and an electric circuit is provided to produce an output signal when a preset change in incident light intensity is detected by any of the photoelectric elements thus indicating the presence of the movable member at the datum line. There may be two slits projecting images of the region around two transverse datum lines on to two separate arrays so that the movable member can be controlled in two dimensions. Alternatively, in place of two separate arrays and two slits a single two dimensional array may be provided suitably masked.

12 Claims, 4 Drawing Figures

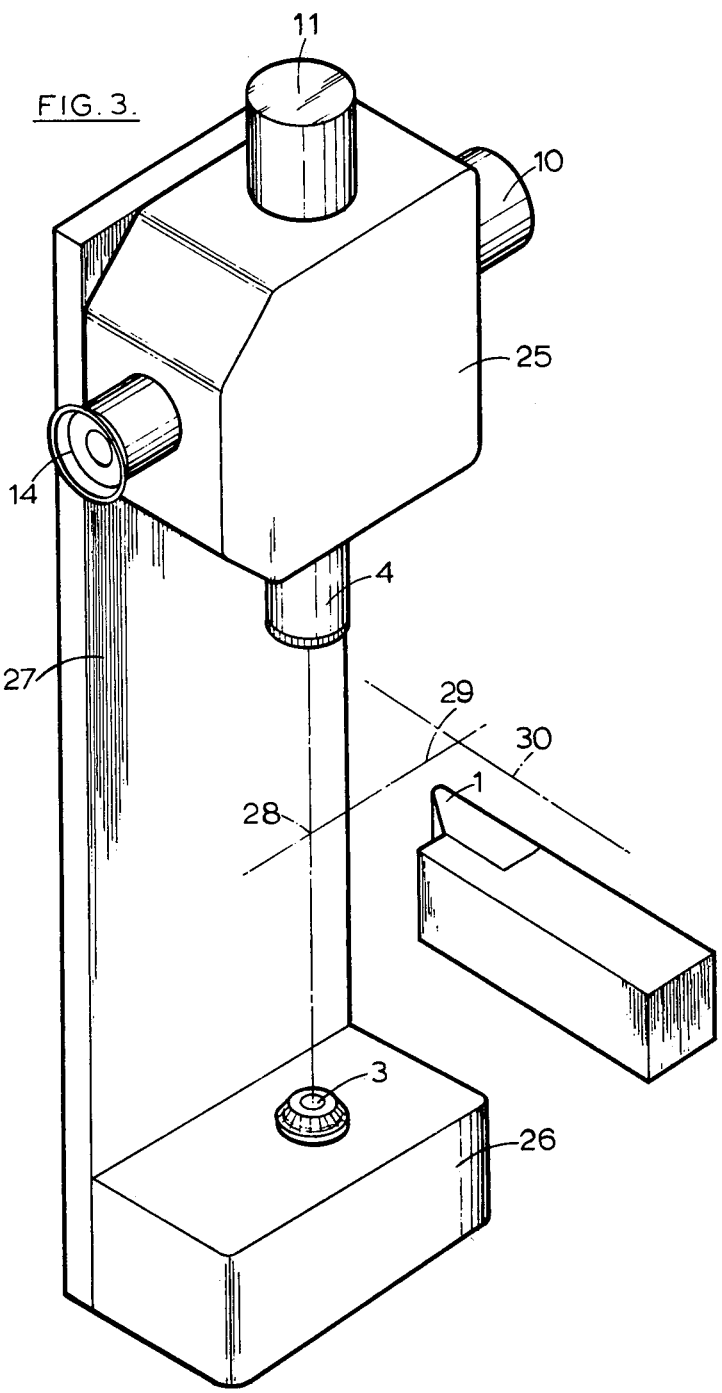

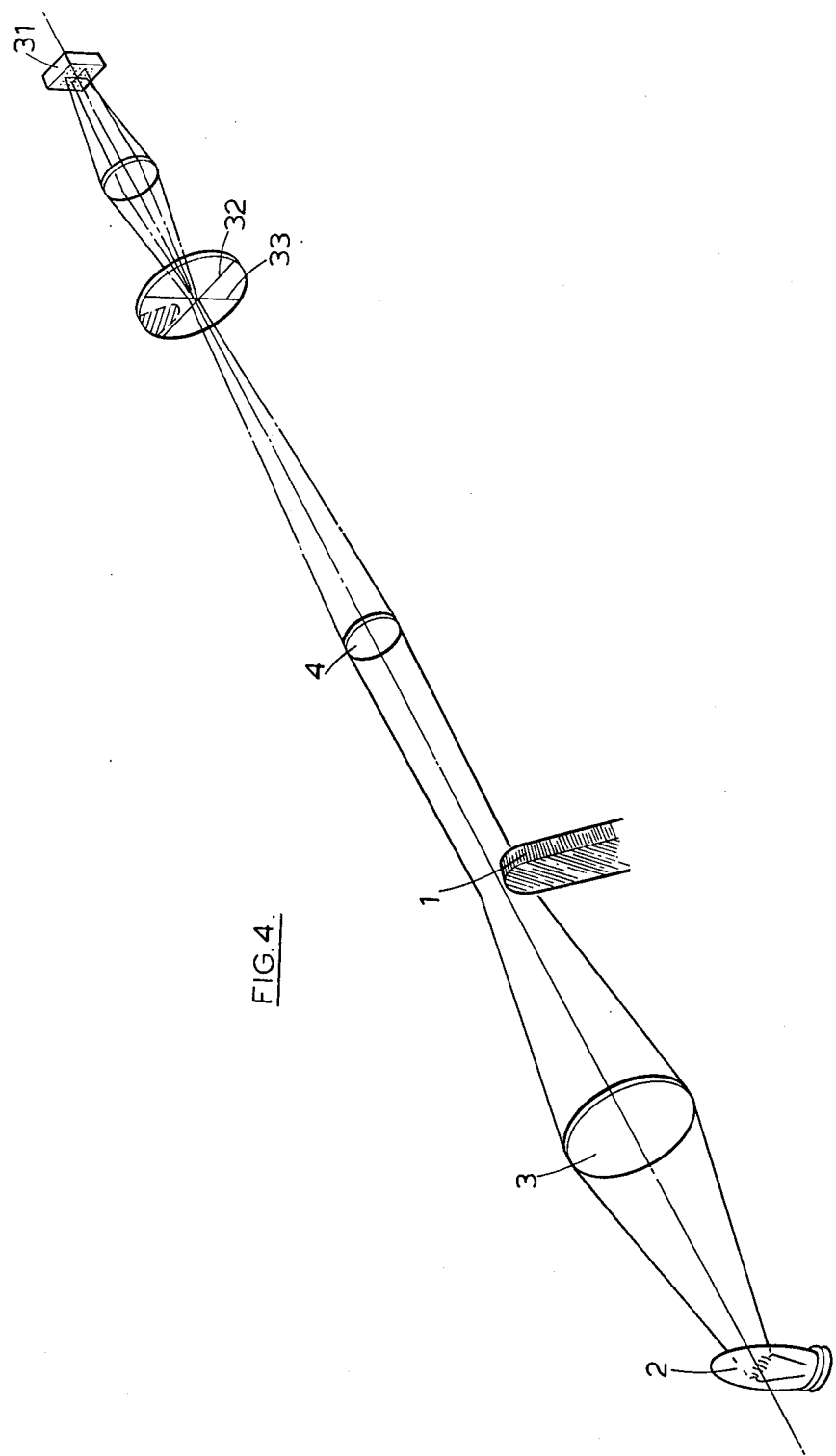

OPTICAL CONTROL MEANS

This invention relates to optical means for controlling or monitoring the position of a movable member, for example for controlling the movement of tool-heads or slides in machine tools. It represents a modification or further development of the invention which forms the subject of our U.S. Pat. No. 3,775,011.

In the specification of that earlier Patent we have disclosed means for automatically controlling the movement of a member (such as the tip of a tool) relative to a datum line comprising an optical system including a slit having a longitudinal axis along which lies an image of the region of the datum line. It is arranged so that an image of the tool tip or other member is caused to fall on the plane of the slit, and its position in relation to the axis of the slit indicates its position relative to the datum line. Means are provided for scanning the slit along its length so as to gate light through successive small portions along the length of the slit, and photo-electric means that receive light passing through the slit respond when the light falls a predetermined amount, indicating obtrusion of the image of the tool tip at least partially across the narrow dimension of the slit.

In that earlier arrangement the means for scanning the slit along its length comprise a rotating disc with a spiral split in it, in the path of the light. This works satisfactorily in practice, but the presence of the rotating element adds bulk and cost, as well as being subject eventually to wear. The present invention represents a further improvement that allows this rotating element to be eliminated.

According to the present invention we provide optical means for automatically controlling or monitoring the position of a member movable relative to a datum line comprising an aperture, means for projecting an image of the region of the datum line onto the slit, an array of photoelectric elements each associated with a different small portion of the slit, and electrical means for scanning the array of elements and producing an output signal when a preset change in incident light intensity is detected by any of the photoelectric elements. Preferably the aperture is in the form of an optical slit.

The photoelectric means may be in the form of a commercially availble self-scanned linear photodiode array. The array may be spaced behind the slit, with a lens focussing an enlarged image of the slit on the array, so that the length of the image equals the length of the array, but in a simpler version the array is mounted directly behind the slit, in fact the slit simply forms a long narrow window for the array of photodiodes. The array is scanned electronically at any suitable frequency, for example anything between 30 Hz and 30 kHz. A typical figure would be 3 kHz. As soon as the signal on any one or more of the diodes falls, indicating the presence of the tool tip of other member obtruding across the slit, a signal is produced and is used to halt the relative movement or initiate a numerical control sequence.

The electronic circuit can incorporate automatic level controlling means that set the zero and 100% illumination intensity, as observed by the signals in the photoelectric means, and keep the response level midway between these.

The new proposal not only eliminates mechanically moving parts but also enables the structure to be made more compact. Preferably, there are two orthogonally arranged slits, allowing the tool tip or other member to be located in two orthogonal directions with a single optical system, employing a beam splitter that also facilitates the provision of an eyepiece for visual observation. The flexibility of self-scanning arrays of photoelectric elements allows the optical system to be simplified still further by using a two dimension array the apparatus then having a single optical axis with no beam splitter.

Embodiments of the invention will now be described, by way of example only, with reference to the accompanying drawings, in which:

FIG. 3 is a pictorial view of the general arrangement of a practical form of the apparatus; and FIG. 4 is a schematic view of the arrangement of optical components in another form of apparatus embodying the invention.

Figure 1:
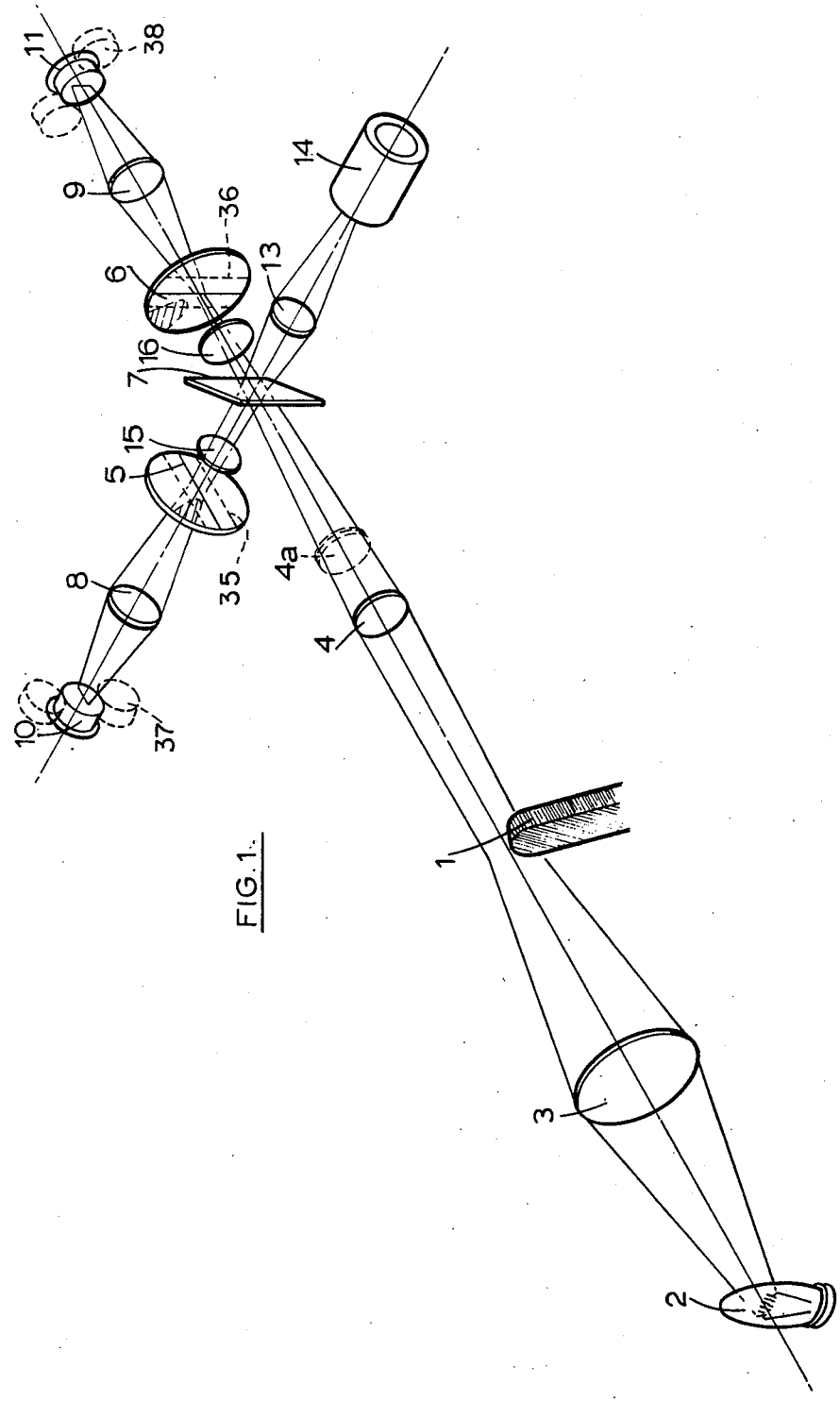
FIG. 1 is a schematic view of the arrangement of optical components in apparatus embodying the invention.

The arrangement of optical components in FIG. 1 is shown in relation to a tool tip 1 which may for example be mounted for movement in a plane in a numerically controlled lathe. The tool tip 1 is illuminated by a filament lamp 2 and condenser lens 3 which are arranged to provide a substantial area of even illumination at the plane of the tool, the optical axis of these components being normal to the plane of the tool. The light passes through an objective lens 4 to a beam splitter 7 in a first of four cardinal directions extending from the beam splitter. The light is split into two beams which leave the beam splitter 7 along a second and third cardinal direction to a pair of graticules on each of which an optical slit 5,6 is formed. The objective lens 4 focuses an image of the tool tip 1 onto the graticules. The slits 5,6 are arranged to appear perpendicular to each other as viewed from the tool tip 1 (thus providing a crosshair effect) and light passing through the slits is imaged by aspheric lenses 8,9 onto two detectors each comprising an array of photodiodes 10,11. The slits 5,6 on the graticules are formed in reflective, metal-coated surfaces of the graticules facing the beam splitter 7 so that unused light is reflected back through the beam splitter to an eyepiece train 13,14. In order to prevent vignetting of the eyepiece image and the use of very large apertures at the aspheric lenses 8,9 additional field lenses 15,16 may be placed in front of the slits 5,6.

The detectors are commercially available self-scanning linear photodiode arrays. One particular array found to be suitable consists of 32 photodiodes each 0.1 × 0.09 mm arranged in a row with 0.1 mm spacing between their centers. Built into the device is an electronic system which connects each diode in turn to an output terminal at which a voltage appears which is proportional to the total amount of light which has fallen on that diode since it was last connected to the output. The scan repetition rate may be between 30 Hz and 30 kHz, the selected rate being limited only by the light available. A scan rate of about 3 kHz is suitable provided the light level is sufficiently high.

Figure 2:
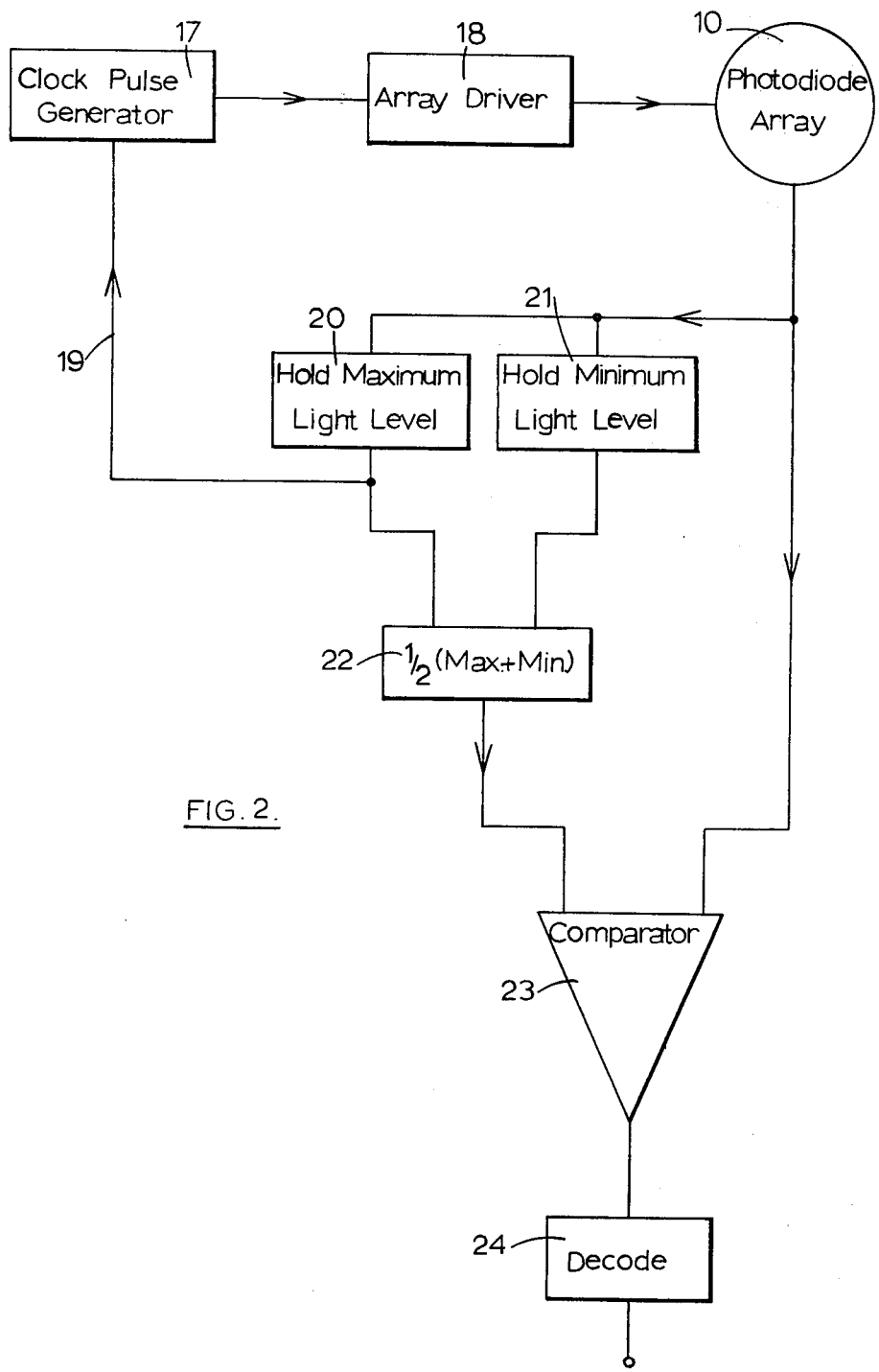
FIG. 2 is a block diagram of the electric circuit associated with one of the arrays of photoelectric elements in the apparatus of FIG. 1.

The block diagram in FIG. 2 illustrates the way in which each photodiode array is used to produce a logic output signal. Each scan of the photodiode array 10 is initiated by a pulse from a clock pulse generator 17 fed through a driver circuit 18. An automatic gain control is fed back to the clock generator 17 through loop connection 19. The ouput video signal from the diode array 10 is fed to a pair of circuits 20,21 for determining the maximum and the minimum levels of the video signal. These circuits produce respective outputs representing the maximum and minimum. The maximum is obtained from any directly illuminated diode and to provide the minimum the slits are arranged to mask one end diode which is thus kept in darkness. The signals representing the maximum and minimum light levels are combined in a further circuit 22 to produce a mean value signal. The mean value signal acts as a reference and is fed to a comparator 23 together with the original video signal. The output from the comparator 23 is fed to a decoding circuit 24, which may comprise a simple trigger producing a logic 0 or 1 output according to whether the comparator output is above or below a trigger level.

Thus the output signal is independent of the intensity of the filament lamp. There are two such electrical systems, one for each photodiode array and each producing a logic output corresponding to whether or not a tool tip interception is detected or not. However some parts of the two circuits may be common; in particular there may be only one clock. The logic outputs can be processed to provide control signals for the lathe in which the tool is mounted. Thus the tool tip can be zeroed on a fixed datum point forming a starting point for 9 numerical control sequence. The tool may be brought to a halt at the datum point or may simply pass both datum axes.

A practical form of the apparatus is shown in FIG. 3 and it comprises an optical unit 25 and a lamphouse 26 mounted at opposite ends of a backplate 27. The backplate 27 is rigidly mounted on the lathe in any suitable position in which the tool tip 1 can be moved by normal movements of the lathe tool holder to set it at the datum point 28. In FIG. 3 axis 29, on which the datum point lies, is parallel and close to the lathe axis and axis 30 defines with axis 29 the plane of movement of the tool tip 1. If the tool is regarded as being in a working position it will be seen that it can be rapidly traversed to set the tool tip 1 at the datum point. Thus the apparatus is clear of the tool during a cutting operation of the lathe. Further clearance may be provided by mounting the backplate 27 on the ram of a fluid piston-and-cylinder unit (not shown) so that the apparatus can be withdrawn from the working areas when not in use, the ram being provided with a stop to define accurately the position of the apparatus when in use. Alternatively the backplate 27 may be omitted and the optical unit 25 and lamphouse 26 rigidly mounted on fixed parts of the lathe, in alignment with each other but clear of the working area.

The lamphouse 26 comprises a simple closed housing containing the filament lamp 2 and having the condenser lens mounted in an aperture in one of its walls. The optical unit 25 comprises a solid block of for example aluminium alloy formed with recesses and bores in which the rest of the optical and the electronic systems are mounted. In particular there are two bores extending through the block at right angles to each other and intersecting at a central point. The beam splitter 7 is located at this intersection with the four cardinal directions of the optical system extending along the four parts of the bores leading away from the intersection. Optical sub-assemblies are fitted in the two ends of each bore. The objective lens 4, in one sub-assembly, is aligned with and faces the condenser lens 3 in the lamphouse 26. The photodiode array 11 together with its respective graticule 5, aspheric lens 8 and field lens 15 form a second sub-assembly mounted in the other end of the bore in which the objective lens 4 is mounted. A similar sub-assembly with photodiode array 10 is mounted in one end of the other bore and the eyepiece train 14 forms the fourth sub-assembly in the opposite end of that bore. Covered recesses in the block house the electronic components which form the circuits described with reference to FIG. 2. Suitable O-rings and seals are provided between the sub-assemblies and the block and between recesses and their covers.

The apparatus described above may be modified in many ways to adjust its characteristics to suit any given application. For example the optical system may be designed so that the objective lens 4 may be positioned in one of two conjugate positions providing different image magnifications. The lens 4 is shown in one position in FIG. 1 and the conjugate position is shown at 4a in dotted outline. One position provides a magnification greater than unity and the other less than unity. The chosen magnification will of course affect the accuracy to which the tool tip 1 can be zeroed on the datum point. Accuracy is also dependent on the slit width.

In a further modification the diode arrays are mounted directly behind the slits, so that the slits in effect form long narrow windows for the arrays. This has the advantage of reducing the length of the optical train and eliminating the two aspheric lenses. However narrower slits which are more difficult to make are required and the eyepiece train must be increased in length.

Instead of an eyepiece, a closed-circuit television camera may be employed, allowing remote operation.

It may in some applications of the apparatus be desirable to sense the approach of the tool tip a short distance from the datum axes so as to be able to reduce the speed of tool advance and stop movement of the tool at the datum point without the risk of overshooting. This can be achieved as shown in dotted lines in FIG. 1 by providing two additional slits 35,36 in each graticule parallel to the main slit 5,6 with one located on each side of the main slit near the edge of the optical field. Photocells 37,38 placed behind these slits are used to indicate the approach of the tool by detecting a drop in light received through the respective slit.

In place of two linear diode arrays a single two dimensional array 31 may be used as shown in FIG. 4. A television picture can be provided directly from the array 31 and the outputs from one column and one row of the array used to drive the detector and logic electronic circuits, the selected row and column of diodes being masked with narrow slits or other apertures. The optics of such a system are arranged along a single axis with no need for a beam splitter.

We claim:
1. Means for controlling the relative movement of a member towards a preset datum line, said means comprising an element in which an optical slit is formed, means causing an optical image of the region of said datum line to fall on said slit with said datum line extending longitudinally of said slit, a photoelectric detector device placed to receive light radiation passing through said slit and an electric circuit connected to said photoelectric detector device, improved in that the said photoelectric detector device comprises an array of discrete photoelectric elements each associated with a different portion of the slit, and said electric circuit is operative to scan said photoelectric elements sequentially and produce an output signal when a preset change in incident light intensity is detected by any of said photoelectric elements indicating the presence of the movable member at the datum line.

2. Means in accordance with claim 1 wherein said array is located adjacent to said slit whereby said slit forms a window for said array.

3. Means in accordance with claim 1 wherein said array is spaced from said slit and there is provided a lens located between said slit and said array in a position in which light passing through said slit is focussed by said lens onto said array.

4. Means in accordance with claim 1 wherein said electric circuit includes a first unit for determining the maximum intensity of light detected by said elements of the array and producing a signal representing said maximum, a second unit for determining the minimum intensity of light detected by said elements of the array and producing a signal representing said minimum, a third unti for processing said signals from said first unit and said second unit and producing a reference signal representing a level midway between said maximum light intensity and said minimum light intensity, means for comparing the light intensity detected by the array during scanning with said reference signal, and means for producing said output signal when a change representing said preset change is indicated at the comparator.

5. Means in accordance with claim 1 wherein said array comprises a self-scanning linear array of photodiodes.

6. Means in accordance with claim 1 wherein said member is relatively movable also in a second direction towards a second preset datum line intersecting said first mentioned datum line, said second direction being transverse to the direction of said first mentioned movement, and including a second element in which a second optical slit extending optically in a direction transverse to said first mentioned slit, said image-causing means causing said image to fall also on said second slit, a second array of discrete photoelectric elements placed to receive light radiation passing through said second slit, each of said photoelectric elements being associated with a different portion of said second slit, and a second electric circuit connected to said second detecting device and operative to scan the elements of said second array sequentially and produce a second output signal when said preset change in incident light intensity is detected by any of said photoelectric elements of said second array.

7. Means in accordance with claim 6 wherein said image-causing means include means defining a first optical path common to both images and extending from the region of intersection of said datum lines to a beam splitting device, and separate second and third optical paths from said beam-splitting device to each of said slits respectively.

8. Means in accordance with claim 7, wherein said elements on which said slits are formed are coated with a reflective material, the slits being formed in the coatings, and means are provided to project light reflected from said coatings back into said beam splitter device along a fourth optical path to form a combined image of said first slit and said second slit.

9. Means in accordance with claim 8 including a housing formed with a first bore and a second bore intersecting said first bore, the beam splitter device being placed at the intersection of said bores and said optical path extending along said bores.

10. Means in accordance with claim 1 wherein said array of photoelectric elements is two dimensional and a second slit transverse to the first-mentioned slit is formed on said element on which said first slit is formed.

11. Means in accordance with claim 1 wherein a first subsidiary slit is formed on said element on which the first-mentioned slit is formed, said first subsidiary slit being parallel to and spaced from said first slit, and a second subsidiary slit is formed on said element parallel to and spaced from said first slit, said first subsidiary slit lying on the opposite side of said first slit to said second subsidiary slit.

12. Means for controlling the relative movement of a member towards a preset datum line, said means comprising an element in which an aperture is formed, means causing an optical image of the region of said datum line to fall on said aperture, a photoelectric detector device placed to receive light radiation passing through said aperture and an electric circuit connected to said photoelectric detector device, improved in that the said photoelectric detector device comprises an array of discrete photoelectric elements each associated with a different portion of the aperture and said electric circuit is operative to scan said photoelectric elements sequentially and produce an output signal when a preset change in incident light intensity is detected by any of said photoelectric elements indicating the presence of the movable members at the datum line.

* * * * *